United States Patent [19]

Malone

[11] Patent Number: 4,824,720
[45] Date of Patent: Apr. 25, 1989

[54] COALESCED POLYOLEFIN FOAM HAVING EXCEPTIONAL CUSHIONING PROPERTIES

[75] Inventor: Bruce A. Malone, Granville, Ohio

[73] Assignee: The Dow Chemical Company, Midland, Mich.

[21] Appl. No.: 155,338

[22] Filed: Feb. 11, 1988

[51] Int. Cl.$^4$ .............................................. B32B 7/02
[52] U.S. Cl. ................................. 428/294; 264/53; 264/46.1; 264/45.1; 264/45.9; 428/398; 521/79; 521/81; 521/134; 521/143; 521/149
[58] Field of Search ................ 264/53, 46.1, 45.1, 264/45.9; 428/294, 398; 521/79, 81, 134, 143, 146, 149

[56] References Cited

U.S. PATENT DOCUMENTS

| | | | |
|---|---|---|---|
| 3,251,728 | 5/1966 | Humbert et al. | 264/53 |
| 3,341,393 | 9/1967 | Powell | 161/57 |
| 3,422,055 | 5/1969 | Maloney | 260/11 |
| 3,433,573 | 3/1969 | Holaday et al. | 8/55 |
| 3,440,130 | 4/1969 | Telkes | 161/5 |
| 3,573,152 | 3/1971 | Wiley et al. | 264/53 |
| 3,758,359 | 9/1973 | Azuma | 156/244 |
| 3,949,031 | 4/1976 | Fairbanks | 264/51 |
| 3,950,278 | 4/1976 | Wada et al. | 521/134 |
| 4,251,584 | 2/1981 | Van Engelen et al. | 428/159 |

*Primary Examiner*—Morton Foelak
*Attorney, Agent, or Firm*—Douglas N. Deline

[57] ABSTRACT

Improved closed cell foams particularly suitable for use in packaging applications comprising a plurality of coalesced strands or profiles of a foamed thermoplastic composition.

15 Claims, 5 Drawing Sheets

COALESCED POLYOLEFIN FOAM HAVING EXCEPTIONAL CUSHIONING PROPERTIES

BACKGROUND OF THE INVENTION

The present invention relates to foamed products. More particularly, the present invention relates to unique foam products having exceptionally good cushioning properties at low static loadings and low densities. More particularly, the present invention relates to such a foam comprising a plurality of coalesced distinguishable expanded strands or profiles.

Foamed objects comprising a plurality of coalesced distinguishable expanded strands of foamed polymers (strand foams) have been previously disclosed in U.S. Pat. No. 3,573,152. The foam objects are prepared by extruding a foamable thermoplastic material through a multi-orefice die plate, whereby the individual foamable elements of the strand are formed, expanded and coalesced upon emerging from the die orifices. For the teachings contained therein, U.S. Pat. No. 3,573,152 is herein incorporated in its entirety by reference thereto.

Although the previously mentioned U.S. Pat. No. 3,573,152 discloses that polyethylene resins may be appropriately employed in the preparation of strand foams, despite diligent efforts by the present inventors, no polyethylene strand foam has been successfully prepared following the teachings of such reference.

Closed cell polyethylene foams are widely employed in the field of packaging in order to provide cushion properties. Fragile objects intended to be transported may be encased and supported in a closed cell foamed polyethylene cushion adapted to conform to the external shape of the object for which protection is desired. Presently known polyethylene foam cushion materials posses properties adapted to provide particular cushioning performance. For example, higher density foams are suitably employed to achieve peak deceleration forces between about 40 to 50 G's (the gravitational constant) at static loadings of between about 0.5 and 1.5 pounds per square inch in standard 24 inch drop tests. At reduced static loadings, between about 0.1 and about 0.5 pounds per square inch, lower density foams on the order of about 1.2 to about 1.8 pounds per cubic foot may be employed. However, suitable cushioning, i.e. peak deceleration forces less than about 50 G's are not obtainable except upon the use of thicker amounts of cushioning foam. Larger thicknesses of cushioning foam result in excess packaging sizes and concomitant elevated shipping costs.

It would be desirable to provide a closed cell cushioning foam adapted to provide improved cushioning properties at reduced static loadings.

In order to provide such an improved closed cell cushioning foam, the present inventors have investigated preparing strand foam or coalesced foam by the techniques disclosed in U.S. Pat. No. 3,573,152. In particular, in using polyethylene resins and standard chlorofluorocarbon blowing agents and a suitable die having a multitude of closely spaced small holes therein, the emerging strands could not be made to coalesce or adhere together under any processing conditions employed. In particular, when the foaming temperature of the resin was increased in an attempt to provide a tacky surface to the emerging strands, foam collapse was experienced. Similarly, when the strands were reheated after emerging from the die face, foam collapse was again experienced.

It has now been discovered that the ability of a foamable resin formulation to form a coalesced foam structure upon exiting a die containing a multiplicity of orifices and subsequently foaming is dependent on the existence of sufficient adhesion between neighboring foam surfaces at the temperature required for such foaming. In particular, certain resins do not possess sufficient surface tacticity in the melt at the temperatures required for foaming to form the desired coalesced structure.

It would be desirable to provide a method for producing a strand foam comprising a polyolefin resin, particularly a polyethylene resin.

In addition, it would be desirable to provide a polyethylene resin strand foam suitable for cushioning objects having improved cushioning properties at low static loadings.

SUMMARY OF THE INVENTION

Figure 1:
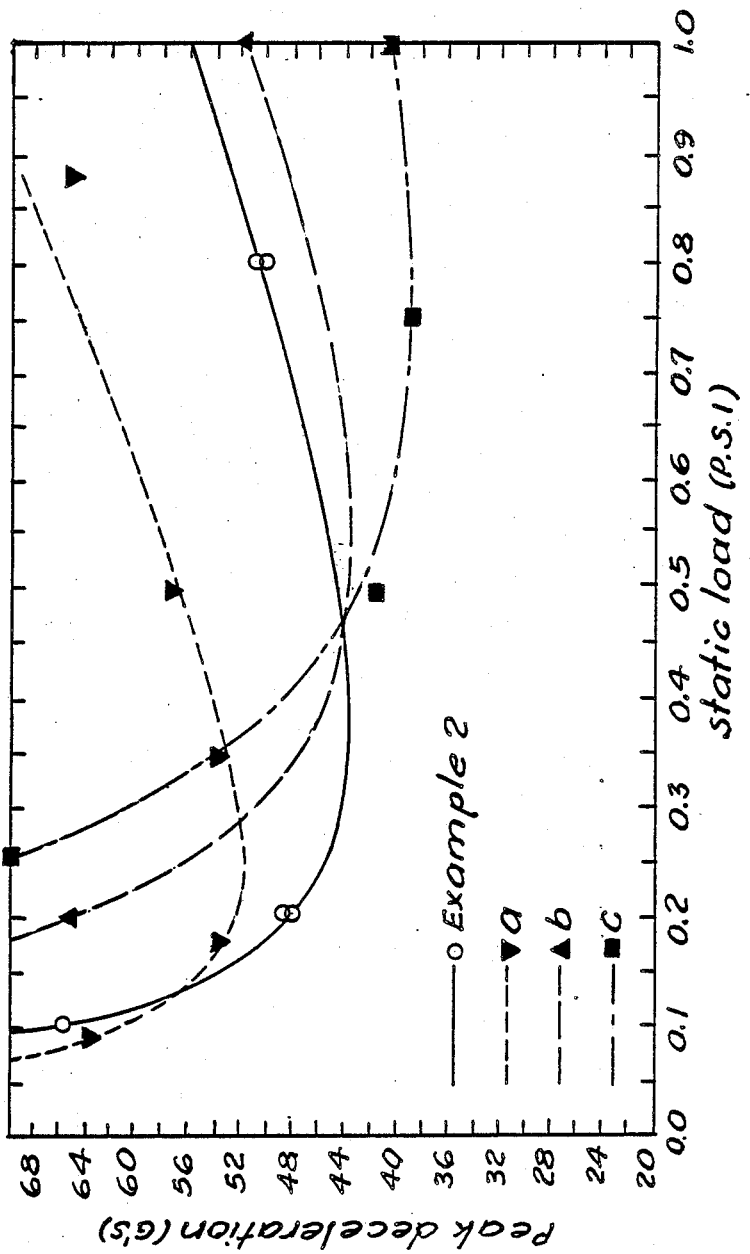
In FIG. 1, there are depicted the cushioning properties of several closed cell polyolefin foams including the foam structure of the present invention. Further description of the preparation and testing of such foams is contained in Example 1.

According to the present invention, there is now provided a closed cell foam structure comprising a plurality of coalesced extruded strands or profiles of a foamed thermoplastic composition comprising, in polymerized form, at least one nonaromatic olefin characterized in that the heat seal strength at a foamable temperature of a film of the thermoplastic composition is at least 3.0 Newton/ inch width and provided further that the foam structure has a gross density from about 0.1 to about 5.0 lbs/ft$^3$ and the strands or profiles are disposed substantially parallel to the longitudinal axis of the foam.

DETAILED DESCRIPTION OF THE INVENTION

The strand foams of the present invention are prepared by the extrusion foaming of a molten thermoplastic composition utilizing a die containing a multiplicity of orifices. The orfices are so arranged such that the contact between adjacent streams of the molten extrudate occurs during the foaming process and the contacting surfaces adhere to one another with sufficient adhesion to result in a unitary structure. Desirably, the individual strands of coalesced polyolefin foam should remain adhered into a unitary structure to prevent strand dcelamination under stresses encountered in preparing, shaping, and using the foam as a cushioning device.

As a technique for identifying suitable thermoplastic compositions for use in the present invention, the aforementioned measurement of heat seal strength of a film thereof is employed. "Heat seal strength" is defined for use herein as the adhesion generated between two film surfaces caused to adhere to one another by application of 40 lbs/in$^2$ pressure for 1.0 sec. at the temperature being tested followed by cooling the film/film laminate for one minute. Such heat sealing may be performed by a Sentinel ® Hot Tack machine, model #12ASL. Bond Strength (Heat Seal Strength) is the force in Newtons/inch width required to cause tearing of at least 50% of the seal area by 180° pull testing. The test constitutes a modification of Dow heat seal test #FS-222 and ASTM F-88. Films of the various materials to be tested may be prepared by placing pellets of the appropriate resin between polyethylene terephthalate sheets placed in a 10"×2" press heated to 180° C. After one minute preheating, the pellets are compressed under a pressure of 5,000 lbs/in$^2$ for thre eminutes, cooled, and cut into 1"×10" strips. Film thickness from 0.004 to 0.006 inches (0.10–0.15 mm) result.

The heat seal strength of a thermoplastic composition is dependent on the temperature thereof, and generally rises as temperature is increased. However, suitable foams may be prepared only in a narrow temperature range. This temperature range is uniquely defined for each foamable composition and is dependent on several factors, most importantly the melt strength of the foamable thermoplastic composition at the temperature range of interest. This in turn is subject to several factors such as the particular thermoplastic resin used, the amount and type of blowing agent employed, amount and types of fillters, nucleating agents and additional additives, the presence or absence of crosslinkers, etc. Accordingly, depending on the density of the individual strands of foam utilized in the present invention (referred to as strand density or local density), the extrusion temperature that must be employed is severely limited to generally only about a 2° C. temperature range. In order to satisfy the requirements of the present invention, the resin should possess at least the aforementioned heat seal strength at such temperature.

Figure 3:
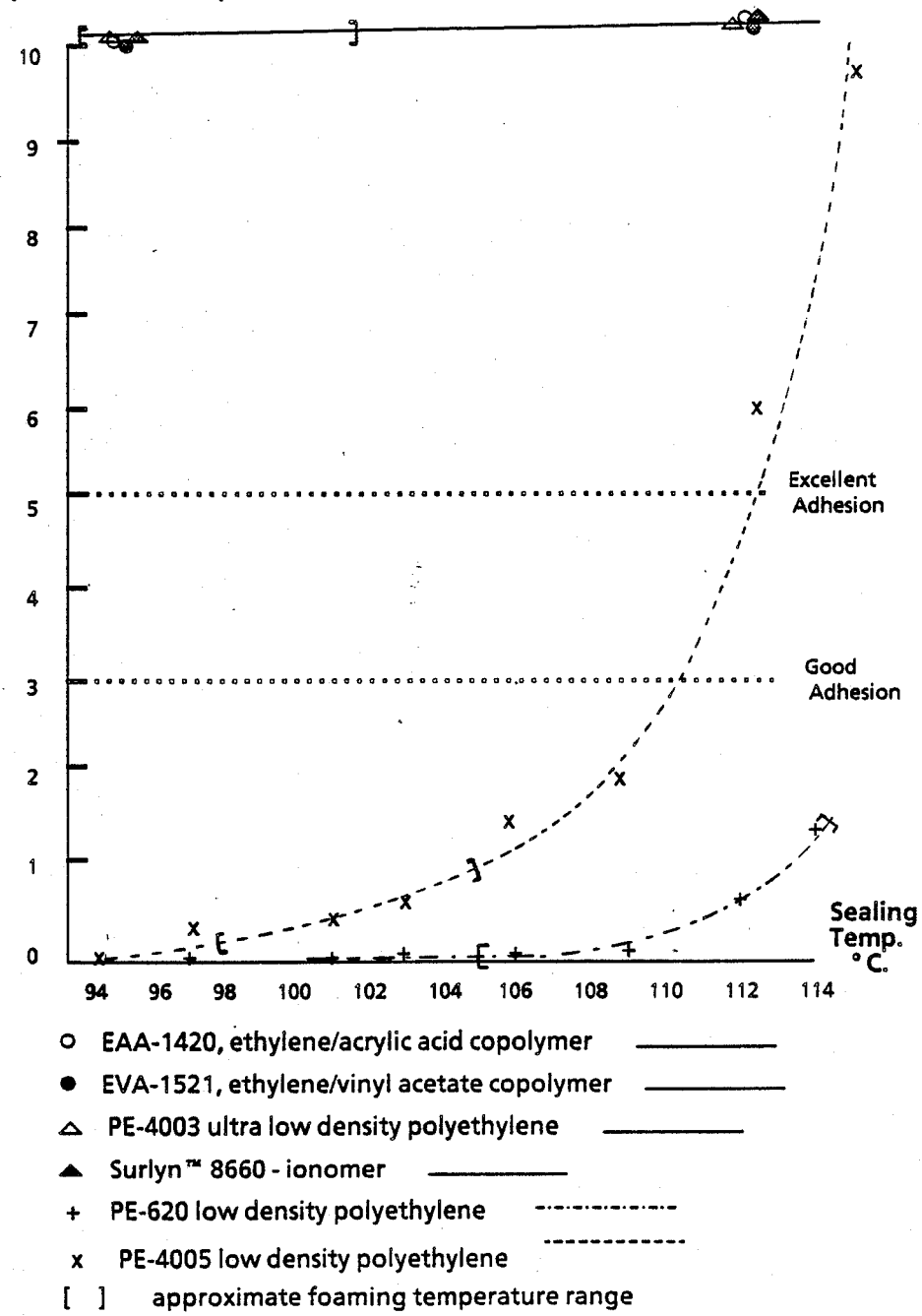
FIGS. 3-5 are graphs showing the heat seal strength of various olefin resins and mixtures of resins and suitable foaming temperatures therefor. Resins providing heat seal strengths of at least 3 Newtons/ inch width and preferably at least 5 Newtons/inch width at a temperature within the range required for foaming are desired for use according to the present invention. EAA-1420, EVA-1521, PE-4003, PE-4005, and PE-620 are all resins that are available from The Dow Chemical Company.
Figure 4:
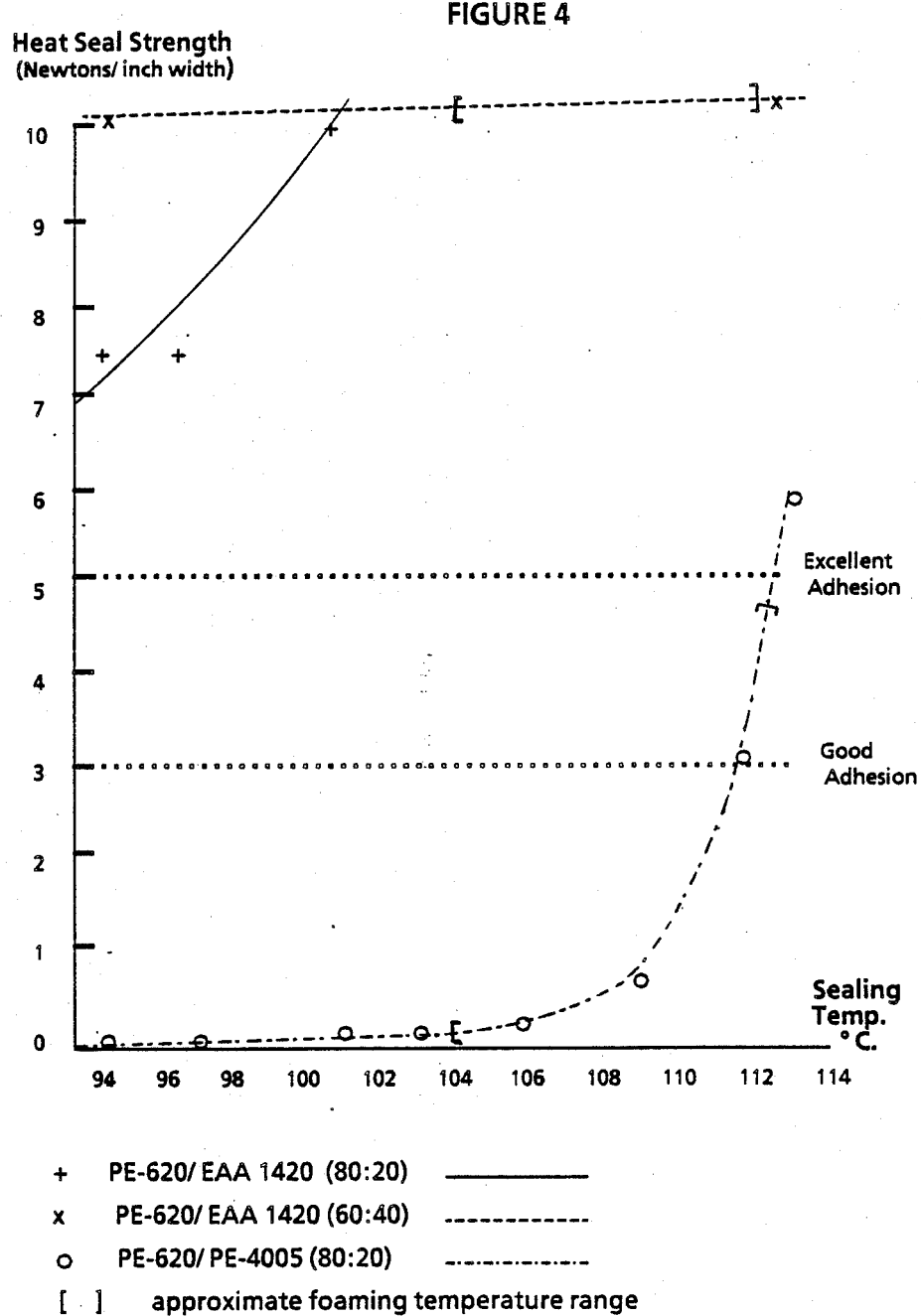
Figure 5:
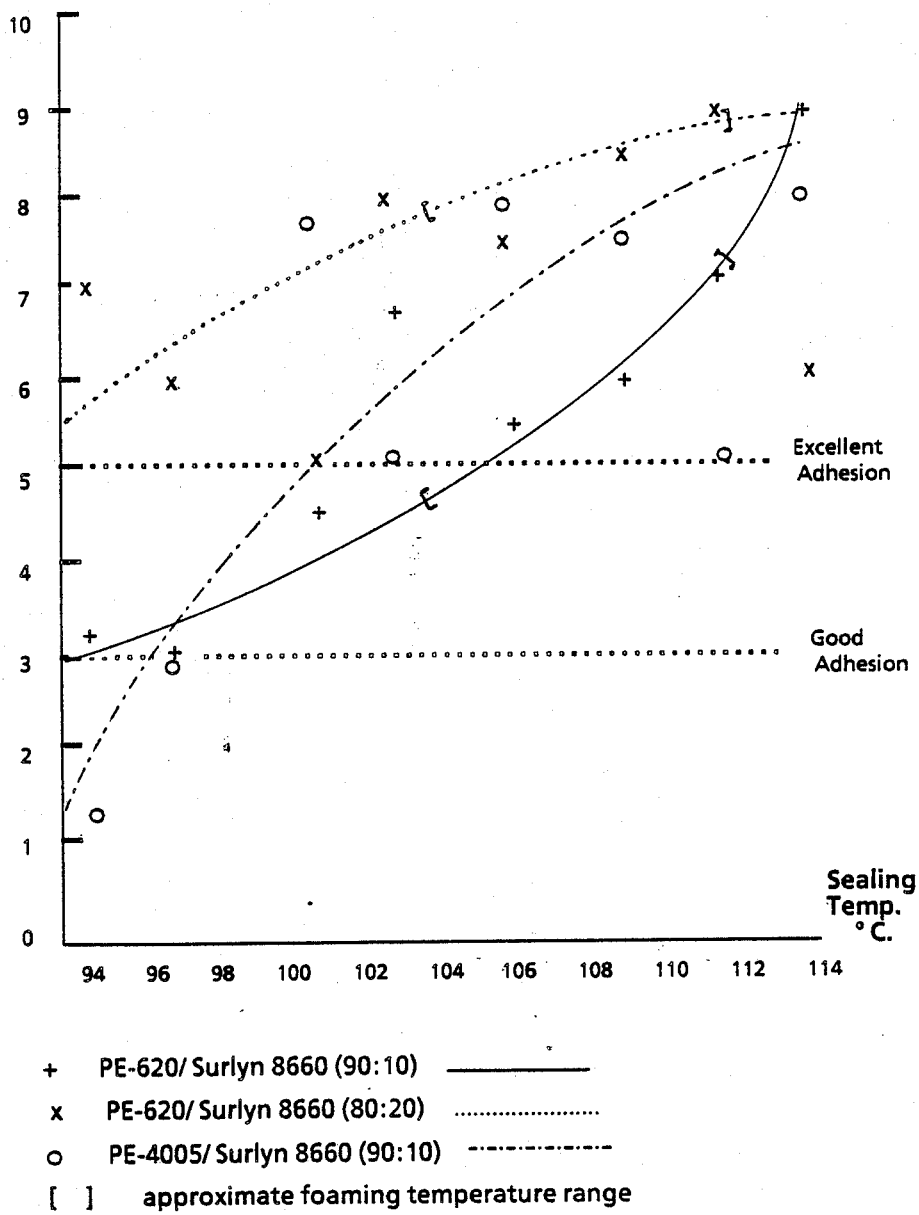

In the appended drawings, FIGS. 3–5 illustrates the above requirements. For various representative thermoplastir esins or blends actual heat seal strengths are provided. Also illustrated are approximate foaming temperatures for such resins over a range of operable densities. A resin may suitably be employed according to the present invention only if adequate surface adhesion between adjacent strands if generated under the conditions required for producing a foam. It is seen that such condition may be accurately predicted by reference to a film heat seal strength measurement of the same thermoplastic composition at the temperatures in question such as are provided in FIGS. 3–5.

As suitable thermoplastic resins comprising, in polymerized form, a nonaromatic olefin there may be utilized copolymers of ethylene and a copolymerizable polar monomer especially a carboxyl-containing comonomer. Examples include copolymers of ethylene and acrylic acid or methacrylic acid and $C_{1-4}$ alkyl ester or ionomeric derivatives thereof; ethylene vinly-acetate copolymers; ethylene/carbon monoxide copolymers; anhydride containing olefin copolymers of a diene and a polymerizable; copolymers of ethylene and an α-olefin having ultra low molecular weight (i.e. densities less than 0.92); blends of all of the foregoing resins; blends thereof with polyethylene (high, intermediate or low density); etc. Particularly preferred thermoplastic compositions are copolymers of ethylene and acrylic acid, (EAA copolymers) having up to about 30% by weight of copolymerized acrylic acid; ionomeric derivatives of the foregoing, copolymers of ethylene and vinyl acetate; ultra low density polyethylene; and blends of the foregoing with one another and with low density polyethylene.

The polymers of ethylene and a polar comonomer may be prepared by known addition polymerization techniques, or by a grafting reaction of the reactive comonomer with a preformed polymer of ethylene. Additional elastomeric components such as polyisobutylene, polybutadiene, ethylene/propylene copolymers, and ethylene/propylene/diene interpolymers may be included in the blend if desired but are not preferred. Moreover, additional components such as crosslinking agents designed either to provide latent crosslinking of the ethylenic polymer, such as silane functional crosslinking agents or covalent or ionic crosslinking agents, may be included if desired.

A preferred resin composition comprises a copolymer of ethylene and acrylic acid or ethylene and vinyl acetate containing from about 85 percent to about 98 percent ethylene. A most preferred thermoplastic composition is a homogeneous, random copolymer of ethylene and acrylic acid. Copolymers of ethylene and acrylic acid or of ethylene and vinyl acetate may be obtained from The Dow Chemical Company. Ethylene vinyl acetate copolymers may also be obtained under the tradename Elvax from E. I. duPont deNemours & Company. Anhydride modified copolymers of ethylene are available under the tradename Plexar from Norchem, Inc. Ionomeric copolymers are available under the tradename Surlyn ® from E. I. duPont deNemours & Company.

Blending of various components in order to provide a suitable thermoplastic omposition for melt extrusion to prepare the coalesced foams of the present invention is accomplished according to known techniques in the art. Suitably, a mixer, extruder or other suitable blending device is employed to obtain a homogeneous melt. An extruder or any other suitable device is then employed to incorporate a known blowing agent such as a chlorofluorocarbons, e.g., 1,2-dichloro-tetra-fluoroethane, 1,2-difluorotetrachloroethane, chlorotrifluoromethane, and mixtures thereof with additional agents such as halogeneted hydrocarbons, hydrocarbons, carbon dioxide, water, etc. Additional agents such as nucleating agents, extrusion aids, antioxidants, colorants, pigments, etc. may also be included in the blend.

The molten extrudate is then forced through a die plate comprising numerous small holes in a suitably desired spacial arrangement or alternatively an array of slits, desirably in an oscillating form such as a sine wave, honeycomb, square saw tooth or triangular saw tooth wave pattern. Most desirably, the alternatings lits are offset so that maxima and minima of adjacent rows are aligned with one another so as to assure contact between rows of extrudate. In the preferred embodiment of the invention, illustrated in FIG. 1, the die face plate, 1, contains several rows of narrow slits, 2, comprising equal length segments joined at 60° angles and aligned with respect to neighboring slits to provide a honeycomb shaped foam structure of separately extruded and coalesced profiles. Such foams prepared wherein the adjoining profiles contain sections adjacent one another having significant surface areas in mutual contact are particularly desired in order to provide structures of improved strength.

Alternately in the use of holes in the die face plate, various geometric shapes particularly non-circular shapes, such as X-, cross- or star-shaped geometry may be employed. The holes or silts may be generated in the die face plate by the use of electromagnetic discharge or laser cutting technology as is well-known in the art. The spacing and arrangement of the holes or slits in the die face plate may be adjusted in order to vary the ultimate cushioning properties of the strand foam and provide in cross-sectional view, coalesced foam structures of repeating structure containing voids having the shape of polygons or closed curves of any description. The only limitation on spacial arrangement of the die orifices is that contact and coalescence of adjacent strands or profiles after extrusion from the die face plate must be achieved.

Foams having gross densities (that is bulk densities or densities of the closed-cell foam including interstitial volumes between strands or profiles), preferably varying from about 0.2 to about 3.0 pounds per cubic foot may be obtained according to the foregoing technique. Most preferred foams are those having a density from about 0.5 to about 2.8 pounds per cubic foot. For specific uses in low weight cushioning applications a preferable alternate embodiment comprises foams having densities less than 1.0 lbs/ft$^3$. The individual strands of foam preferably possess a local or strand density from about 0.5 to about 6.0 lbs/ft$^3$, and most preferably from about 1.0 to 3.0 lbs/ft$^3$.

The open channels or voids in the foams of the present invention are arranged in a direction parallel to the extruded strands. The presence of such open channels contributes to the unique cushioning properties of the present invented foam and their shape, size, and frequency of occurrence may be varied through adjustments of the size, location and shape of the die face plate's holes or slits. In one embodiment, the voids occurring in the interior of the foam structure or in one portion thereof may be larger, differently shaped of more or less numerous than those voids that are nearer the surface or in the remaining portion of the foam structure in order to provide tailored cushioning properties in the resulting structure. Preferably the individual strands have a maximum cross-sectional dimension and the profiles have a maximum thickness from about 0.5 to about 10.0 mm, most preferable 1.0 to 5.0 mm.

The coalesced strands may form a plank or other object having a larger cross-sectional area than is possible utilizing existing polyolefin foam extrusion techniques. For example, utilizing equivalent extrusion rates, a foam structure according to the invention may be prepared having a cross-section that is up to 8 time larger than the maximum cross-sectional area of an extruded foam article prepared utilizing a single orifice opening.

Desirably, foams according to the present invention allow the achievement of improved cushioning of objects particularly at low static loadings. For example, preferably according to the present invention, two inch thick samples of the invented closed-cell strand foams when tested at a 24 inch drop height have dynamic cushioning properties such that objects inducing static loads (SL) of from about 0.18 to about 0.5 lb/in$^2$ at the earth's surface experience a peak deceleration of less than about 65 G's, preferably loads of from about 0.15 to about 0.4 lb/in$^2$ experience peak decelerations of less than aobut 55 G's. In measuring such cushioning properties, the technique employed is ASTM D-1596.

Having described the invention, the following examples are included as illustrative and are not to be construed as limiting.

EXAMPLE 1

A blend of 80 weight percent polyethylene (PE-620, available from The Dow Chemical Company) and 20 weight percent of a homogeneous random copolymer of ethylene and acrylic acid containing approximately 6.5 percent acrylic acid (EAA-459 available from The Dow Chemical Company) and 22 parts per hundred 1,2-dichlorotetrafluoroethane blowing agent is extruded through a 1.5 inch extruder connected to a die having 89 equally spaced circular shaped holes arranged in five rows. The holes were approximately 0.040 inches in diameter and spaced approximatley 0.125 inches between centers. Upon extrusion, the individual strands adhered to one another to form a uniformly coalesced closed-cell structure. No evidence of foam instability was observed. The resulting foam had a gross density of about 2.4 pounds per cubic foot and had approximately 10 percent by volume open channels running in parallel rows in the extrusion direction. The diameter of the closed-cell strands are eapproximately 0.125 inch (3.2 mm).

EXAMPLE 2

The conditions of Example 1 were substantially repeated excepting that the resin blend comprised approximately 40 percent by weight of a homogeneous random copolymer of ethylene and acrylic acid containing 6,5 percent acrylic acid (EAA-459 available from The Dow Chemical Company) and 30 parts per hundred 1,2-dichlorotetrafluoroethane blowing agent. The remainder of the resin blend comprised low density polyethylene (PE-620 available from The Dow Chemical Company). The resin blend was extruded through a die face plate having approximately 800 holes. Each hole was approximately 0.04 inches (1.0 mm) in diameter. Holes and rows were equally spaced at approximately 0.125 inches (3.2 mm) between centers. The resulting foam had approximatley 15 percent open volume in channels running in the extrusion direction and had a foam gross density of 1.8 pounds per cubic foot.

EXAMPLE 3

A die face plate having 28 individual X-shaped incisions the height and width of each X approximately 0.10 inches (4.8 mm) and the width of the incision being approximately 0.015 inches (0.4 mm) was employed. The X-shaped incisions were arranged in 5 rows, spaced approximately 0.0625 inches (1.6 mm) apart. A resin blend substantially the same of that in Example 1 was then extruded through the die face plate at a rate such that upon expansion, the resulting X-shaped foam strands contacted one another on the tips only of the X-shaped cross-sectional dimensions. The resulting foam contained approximatley 35 percent by volume open channels in the extrusion direction of the plank. The foam gross density was 2.6 pounds per cubic foot.

TESTING

Various conventional polyolefin resin foams and the strand foam of Example 2 were tested for cushioning properties. Two inch thick samples of closed cell foams were tested for peak deceleration at 24 inch drop heights. Besides a foam according to the invention prepared according to Example 2, three additional conventional closed-cell foams (a, b, c) were tested, (a) was a foam of 1.4 lbs/ft³ density comprising a blend of ethylene acrylic acid and ethylene vinyl acetate (25 weight percent EAA-1430 available from The Dow Chemical Company, and 75 percent Elvax 470, available from E. I. duPont deNemours and Co.). (b) and (c) were conventional closed-cell polyethylene foams of 1.8 and 2.4 pounds per cubic foot density, respectively. Cushioning properties were measured according to ASTM D-1596. The results are contained in FIG. 1. In the figure, Example 2, is the result obtained for the foam of Example 2, and (a), (b) and (c) identify the results obtained for foams (a), (b) and (c), respectively. A computer generated empirical fit is supplied for each of the foams. The fit is a formula, wherein peak deceleration, measured in G's, is defined as a function of static load (SL) for the various curves.

By reference to FIG. 1 and the results of the testing, it may be seen that a unique cushioning ability at reduced static loadings is obtained by the foams according to the present invention. In particular, at static loads from about 0.1 to about 0.5 pounds per square inch, the coalesced foams of the present invention produce peak decelerations from about 65 to about 45 G's or less. More particularly, at static loadings from about 0.15 to about 0.4, the compositions of the invention provide peak decelerations less than about 55 G's, which are unattainable by the use of equivalent thicknesses of conventional foam cushioning materials.

The computer generated fit for the various curves are as follows:

| Example 2 | G's = 20.7 + 31.1(SL) + 4.3/SL |
| a | G's = 32.5 + 38.2(SL) + 2.5/SL |
| b | G's = 3.2 + 37.2(SL) + 10.9/SL |
| c | G's = 7.2 + 30.1(SL) + 17.7/SL |

Foams according to the invention are capable of providing peak decelerations measured in G's in the range of static loadings from about 0.15 to about 0.4 lb/in² less than or equal to the value determined by the formula $G's = 20.7 + 31.1(SL) + 4.3/SL$.

What is claimed is:

1. A closed cell foam structure comprising a plurality of coalesced extruded strands or profiles of a foamed thermoplastic composition comprising a copolymer of ethylene and an ethylenically unsaturated comonomer or a blend of two or more nonaromatic olefin polymers characterized in that the heat seal strength of a film of the thermoplastic composition is at least 3.0 Newtons/inch width and provided further that the foam structure has a gross density from about 0.1 o about 5.0 lbs/ft³ and the strands or profiles are disposed in substantially parallel arrangement to the longitudinal axis of the foam.

2. A foam according to claim 1, wherein a two inch thick sample has dynamic cushioning properties such that objects inducing static loads of from about 0.15 to about 0.4 lbs/in² dropped from a height of about 24 inches at the earth's surface experience a peak deceleration of less than about 55 G's.

3. A foam according to claim 2, wherein the peak deceleration (G's) in the range of static loadings (SL) from about 0.15 to about 0.4 lb/in² is less than or equal to the value generated by the formula $G's = 20.7 + 31.1(SL) + 4.3/SL$.

4. A foam according to claim 1 having a gross density of from about 0.2 to about 3.0 lbs/ft³.

5. A foam according to claim 4 having a gross density from about 0.5 to about 2.8 lbs/ft³.

6. A foam according to claim 1, having strands or profiles of a local density from about 0.5 to 6.0 lbs/ft³.

7. A foam according to claim 6, having strands or profiles of a local density from about 1.0 to 3.0 lbs/ft³.

8. A foam according to claim 1, wherein the thermoplastic composition copmprises a copolymer of ethylene and a polar comonomer.

9. A foam according to claim 8, wherein the thermoplastic composition is selected from the group consisting of copolymers of ethylene and acrylic acid and ionomeric derivatives thereof; ethylene/vinyl acetate copolymers; copolymers of ethylene and an α-olefin having ultra low density; blends of the forgoing resins; and blends of the forgoing resins with low density polyethylene.

10. A foam according to claim 1, wherein the strands are each approximately 0.5 to about 10.0 mm in the largest cross-sectional dimension, or the profiles are each approximately 0.5 to about 10.0 mm in cross-sectional thickness.

11. A foam according to claim 10, wherein the strands are each about 1.0 to 5.0 mm in the largest cross-sectional dimension, or the profiles are each approximately 1.0 to about 5.0 mm in cross-sectional thickness.

12. A foam according to claim 1 additionally comprising a crosslinking agent.

13. A foam according to claim 1, wherein the strands have a non-circular cross-sectional shape.

14. A foam according to claim 12, wherein the strand's cross-sectional shape is that of a star, cross or X.

15. A foam according to claim 1 wherein the profiles when coalesced describe in cross-section a repeating structure containing voids having the shape of polygons or closed curves.

* * * * *

UNITED STATES PATENT AND TRADEMARK OFFICE
CERTIFICATE OF CORRECTION

PATENT NO. : 4,824,720

DATED : April 25, 1989

INVENTOR(S) : Bruce A. Malone

It is certified that error appears in the above-identified patent and that said Letters Patent is hereby corrected as shown below:

Column 1, line 37, "posses" should correctly appear as --possess--.

Column 2, line 67, "dcelamination" should correctly appear as --delamination--.

Column 3, line 20, "thre eminutes," should correctly appear as --three minutes,--.

Column 3, line 34, "fillters," should correctly appear as --fillers,--.

Column 3, line 46, "plastir esins" should correctly appear as --plastic resins--.

Column 3, line 51, "if" should correctly appear as --is--.

Column 4, line 39, "omposition" should appear as --composition--.

Column 4, line 58, "lits" should correclty appear as --slits--.

Figure 2:
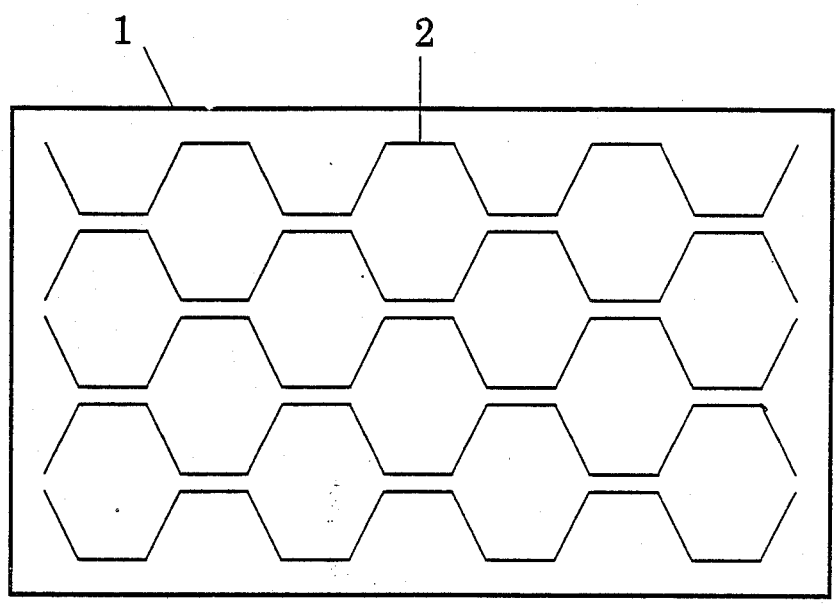
In FIG. 2, there is depicted a die face plate comprising narrow slits suitable for preparing a coalesced foam having a honeycomb structure.

Column 4, line 62, "FIG. 1," should correctly appear as --FIG. 2,--.

UNITED STATES PATENT AND TRADEMARK OFFICE
CERTIFICATE OF CORRECTION

PATENT NO. : 4,824,720
DATED : April 25, 1989
INVENTOR(S) : Bruce A. Malone

It is certified that error appears in the above-identified patent and that said Letters Patent is hereby corrected as shown below:

Column 5, line 55, "time" should correctly appear as --times--.

Column 6, line 19, "approximatley" should appear as --approximately--.

Column 6, line 27, "are eapproximately" should correctly appear as --was approximately--.

Column 6, line 34, "6,5" should correctly appear as --6.5--.

Column 8, line 1, "0.1 o" should correctly appear as --0.1 to--.

Column 8, line 24, "copmprises" should correctly appear as --comprises--.

Signed and Sealed this

Twenty-second Day of May, 1990

Attest:

HARRY F. MANBECK, JR.

Attesting Officer

Commissioner of Patents and Trademarks